United States Patent [19]
Moulton et al.

[11] Patent Number: 5,774,489
[45] Date of Patent: Jun. 30, 1998

[54] TRANSVERSELY PUMPED SOLID STATE LASER

[75] Inventors: Peter Moulton, Concord; James Harrison, Belmont; Robert J. Martisen, Amesbury, all of Mass.

[73] Assignee: Schwartz Electro-Optics, Inc., Orlando, Fla.

[21] Appl. No.: 623,157

[22] Filed: Mar. 28, 1996

[51] Int. Cl.$^6$ .................................................. H01S 3/091
[52] U.S. Cl. ............................... 372/70; 372/34; 372/66; 372/92; 372/75
[58] Field of Search ................................. 372/69, 70, 75, 372/92, 34, 66

[56] References Cited

U.S. PATENT DOCUMENTS

5,455,838  10/1995  Heritier et al. .......................... 372/70

*Primary Examiner*—Leon Scott, Jr.
*Attorney, Agent, or Firm*—Iandiorio & Teska

[57] ABSTRACT

A transversely pumped solid state laser includes: a solid state gain medium having thickness, width and longitudinal dimensions; means for forming a laser cavity with the medium for generating a laser beam along the longitudinal dimension; and a semiconductor laser pump source for directing a collimated pump beam to the medium along the width dimension transversely to the longitudinal dimension constrained toward the center of the medium and having a width which is substantially shorter than the longitudinal dimension of the medium for spacing the edges of the collimated beam away from the longitudinal ends of the medium to reduce thermomechanical distortion of the longitudinal ends of the medium and consequent distortion of the laser beam.

23 Claims, 7 Drawing Sheets

TRANSVERSELY PUMPED SOLID STATE LASER

FIELD OF INVENTION

This invention relates to a transversely pumped solid state laser and more particularly to such a laser which generates a highly efficient linearly polarized laser output beam.

BACKGROUND OF INVENTION

Solid state lasers or amplifiers use a solid material that contains ions with the necessary electron energy levels to provide stimulated emission. The inversion in ion level population required for stimulated emission is typically induced by an optical pump source, the power of which is directed into the solid material and absorbed therein. Historically, the pump sources have been electrically powered gas-discharge lamps or incandescent lamps, although other lasers have been used as well for pump sources. In particular, semiconductor diode lasers have been employed as pump sources. The overall efficiency of solid state lasers pumped by diode lasers is generally higher than that of lamp-pumped lasers: the waste heat produced by both the pump source and that deposited in the solid material is typically less; diode lasers are more compact and rugged sources of power; and the operating life of diode lasers is at least tenfold greater.

The geometry of diode-pumped lasers falls into two general categories, longitudinal (or end) pumping, where the pump-laser beam and solid state laser resonator mode (hereinafter referred to as the laser mode or beam) propagate in essentially the same direction in the laser material, and transverse (or side) pumping, where the pump beam and laser mode travel transverse to each other.

With longitudinal pumping it is possible to arrange a high degree of spatial overlap between the volume of material pumped by the beam from a single diode laser and the volume occupied by the laser mode. As a result, longitudinally pumped lasers pumped by single diode lasers can be made to efficiently generate diffraction-limited outputs. There are techniques involving the use of fiber optics to couple the output beams from a multitude of diode lasers into one beam, which can then be used to longitudinally pump a solid state laser to produce higher powers than possible from pumping by a single diode laser. Another approach to longitudinal pumping is disclosed in U.S. Pat. No. 4,785,459 and is often referred to as the tightly folded resonator (TFR), where the laser mode is made to reflect back and forth between two surfaces of the laser material in a zig-zag pattern. Each reflection point provides a location for the entrance of another pump beam from a diode laser. The TFR design is well suited for use with a linear array of diode lasers fabricated from one long bar of semiconductor material. Such linear arrays are commercially available, and provide the lowest cost per unit of laser power from available semiconductor lasers.

Difficulties in the operation of longitudinally pumped lasers arise as the total pump power from the diode pump laser or lasers increases. At some power level the material fractures, due to stress from large thermal gradients introduced into the material by the pumping process. At pump powers below the fracture level, the gradients are still a problem, as they create thermo-optic distortion in the material from a combination of the change with temperature of the refractive index of the material, the effects of stress on the refractive index and the mechanical distortion of the material surface from thermal expansion. The distortion that affects the laser mode, making it difficult to obtain the diffraction-limited operation, can be corrected to some extent, but the correction may be suitable over only a limited range of pump powers, and thus the properties of the laser mode become sensitive to changes in pump power. In addition, the effect of stress-induced birefringence in the laser material can make it difficult to efficiently generate power output in a linearly polarized laser mode and can reduce laser efficiency when polarizing elements are introduced into the laser resonator.

In order to overcome the ultimate limiting power from thermal fracture, one can change pump geometries to transverse pumping. In that case the pump power can easily be spread over a large volume of material. Linear arrays of diode lasers with appropriate optics are good sources for transverse pumping, as they can generate a pumped region that is long in the propagating direction of the laser mode and comparable to the length of the material. However, with transverse pumping there is a greater difficulty compared to longitudinal pumping in matching the pumped volume to that occupied by a diffraction-limited laser mode. Because of this, the efficiency of transverse-pumped lasers in generating a diffraction-limited mode has been generally lower than that of longitudinally pumped devices. Also, the use of transverse pumping does not eliminate problems with distortion of the laser mode from thermal gradients in the laser material. Even if the pump power is deposited uniformly along the long dimension of the laser material, the flow of heat from the inside regions of the material to the outer surfaces where the heat is extracted leads to a thermal gradient in the general direction of the heat flow. It is difficult to avoid having the laser mode pass through regions where gradients and stress are present. The optical distortion due to thermal gradients in the bulk of material results from two main effects, namely, the change in material refractive index with temperature and the change in index due to the stress in the material created by the gradients. Stress-induced refractive index changes can lead to optical distortion not only of the phasefront of the laser beam but also the polarization properties, since, in general, the stress creates birefringence in the material. The induced birefringence leads to depolarization of linearly polarized light passing through the stressed region. The depolarization creates loss in cavities with polarizing elements, thereby reducing laser efficiency.

One solution to the problem of distortion is to choose laser materials that minimize optical and polarization distortion by virtue of having a relatively small change in refractive index with gradient and in addition by having a natural birefringence that overwhelms the stress-induced birefringence. One example of such material is the fluoride $LiYF_4$ (YLF), which, along with other fluoride compounds, is known to cause much less optical and polarization distortion under comparable operating conditions than the common laser material $Y_3Al_5O_{12}$ (YAG) typically used in the above-described longitudinally and transversely pumped lasers. However, YLF and other fluoride materials are not as favorable as YAG in terms of thermal and mechanical properties and as a result have significant end face distortion (end effects) caused by strong thermal gradients near the end faces of the fluoride laser material, with consequent distortion of the laser beam. This reduction in laser beam quality is only exacerbated in more efficient multipass laser designs where the beam passes through the end faces many times. Although experts in the field have indicated that end face distortion in transversely pumped laser systems is not typically problematic see, for example, T. M. Baer and M. S.

Keirstead, "Modeling of High-Power End-Pumped Solid State Lasers", in *Advanced Solid State Lasers and Compact Blue-Green Lasers Technical Digest,* 1993 (Optical Society of America, Washington, D.C., 1993), Vol. 2, pp. 72–74, the present invention, however, results from the appreciation that such end effects are a significant problem in generating a high quality, diffraction-limited laser beam.

SUMMARY OF INVENTION

It is therefore an object of this invention to provide a transversely pumped solid state laser which has reduced thermomechanical distortion of the end faces of the laser material and consequently reduced distortion of the laser beam.

It is a further object of this invention to provide such a transversely pumped solid state laser which generates a high quality diffraction-limited beam.

It is a further object of this invention to provide such a transversely pumped solid state laser which produces a highly efficient linearly polarized output.

It is a further object of this invention to provide such a transversely pumped solid state laser which has reduced optical and polarization distortion.

It is a further object of this invention to provide such a transversely pumped solid state laser which is less susceptible to material fractures and mechanical distortion due to stress from large thermal gradients caused by increased pumping power.

It is a further object of this invention to provide such a transversely pumped solid state laser that reduces the effects of pumped-induced heating of the laser material on the properties of the laser output beam.

This invention results from the realization that a highly efficient linearly polarized laser output beam may be generated with a transversely pumped solid state laser by constraining the semiconductor laser pump source and the collimated pump beam toward the center of the solid state laser material spaced from the longitudinal ends of the material to reduce thermomechanical distortion of the longitudinal ends of the material and consequent distortion of the laser beam.

This invention features a transversely pumped solid state laser. The laser includes a solid state gain medium having thickness, width and longitudinal dimensions. There are means for forming a laser cavity with the medium for generating a laser beam along the longitudinal dimension. There is a semiconductor laser pump source for directing a collimated pump beam to the medium along the width dimension transversely to the longitudinal dimension constrained toward the center of the medium and having a width which is substantially shorter than the longitudinal dimension of the medium for spacing the edges of the collimated beam away from the longitudinal ends of the medium to reduce thermomechanical distortion of the longitudinal ends of the medium and consequent distortion of the laser beam.

In a preferred embodiment there may further be included means for removing heat from the ends of the thickness dimension. The medium may include a reflective surface on the width end opposing the width end receiving the collimated pump beam. The pump source may include at least two pumping devices longitudinally spaced on opposite sides of the medium. The means for forming a cavity may include means for generating multiple longitudinal passes of the laser beam in the medium. The medium may be Nd:YLF. The edges of the pump beam may be spaced from the longitudinal ends of the medium by at least approximately half the thickness dimension of the medium.

This invention also features a transversely pumped solid state laser amplifier. The laser includes a solid state gain medium having thickness, width and longitudinal dimensions. There are means for directing a laser beam to be amplified along the longitudinal dimension of the medium. There is a semiconductor laser pump source for directing a collimated pump beam to the medium along the width dimension transversely to the longitudinal dimension constrained toward the center of the medium and having a width which is substantially shorter than the longitudinal dimension of the medium for spacing the edges of the collimated beam away from the longitudinal ends of the medium to reduce thermomechanical distortion of the longitudinal ends of the medium and consequent distortion of the laser beam.

In a preferred embodiment there may further be included means for removing heat from the ends of the thickness dimension. The medium may include a reflective surface on the width end opposing the width end receiving the collimated pump beam. The pump source may include at least two pumping devices longitudinally spaced on opposite sides of the medium. The means for directing the laser beam may include means for generating multiple longitudinal passes of the laser beam in the medium. The medium may be Nd:YLF. The edges of the pump beam may be spaced from the longitudinal ends of the medium by at least approximately half the thickness dimension of the medium.

DISCLOSURE OF PREFERRED EMBODIMENT

Other objects, features and advantages will occur to those skilled in the art from the following description of a preferred embodiment and the accompanying drawings, in which.

Figure 1:
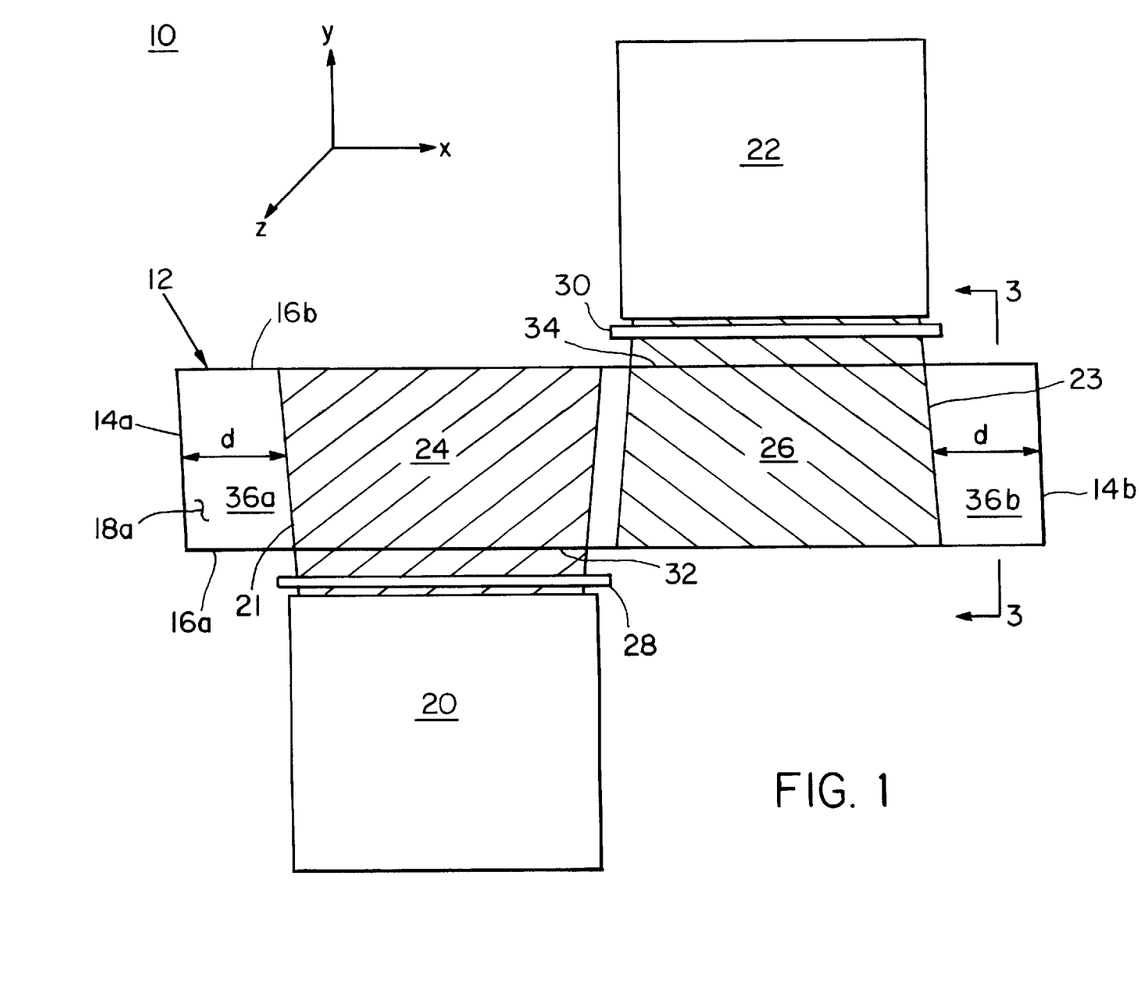
FIG. 1 is a simplified top plan view of a transversely pumped solid state laser according to this invention.

There is shown in FIG. 1 a top plan view of transversely pumped solid state laser 10 comprised of a slab of solid state laser gain medium or material 12, (approximately 28 mm long, 2.5 mm thick and 6 mm wide) which is optimally composed of a fluoride laser material such as $LiYF_4$ (hereinafter referred to as YLF) doped with Nd ions (Nd:YLF). Other fluoride compounds which also show much less optical and polarization distortion under comparable operating conditions as compared to the common laser material $Y_3Al_5O_{12}$ (hereinafter referred to as YAG) may also be used along with other ions. Even YAG or any other laser material could be used with this invention. While those materials will have their usual inherent limitations, the end effects will be reduced, as described below.

Figure 3:
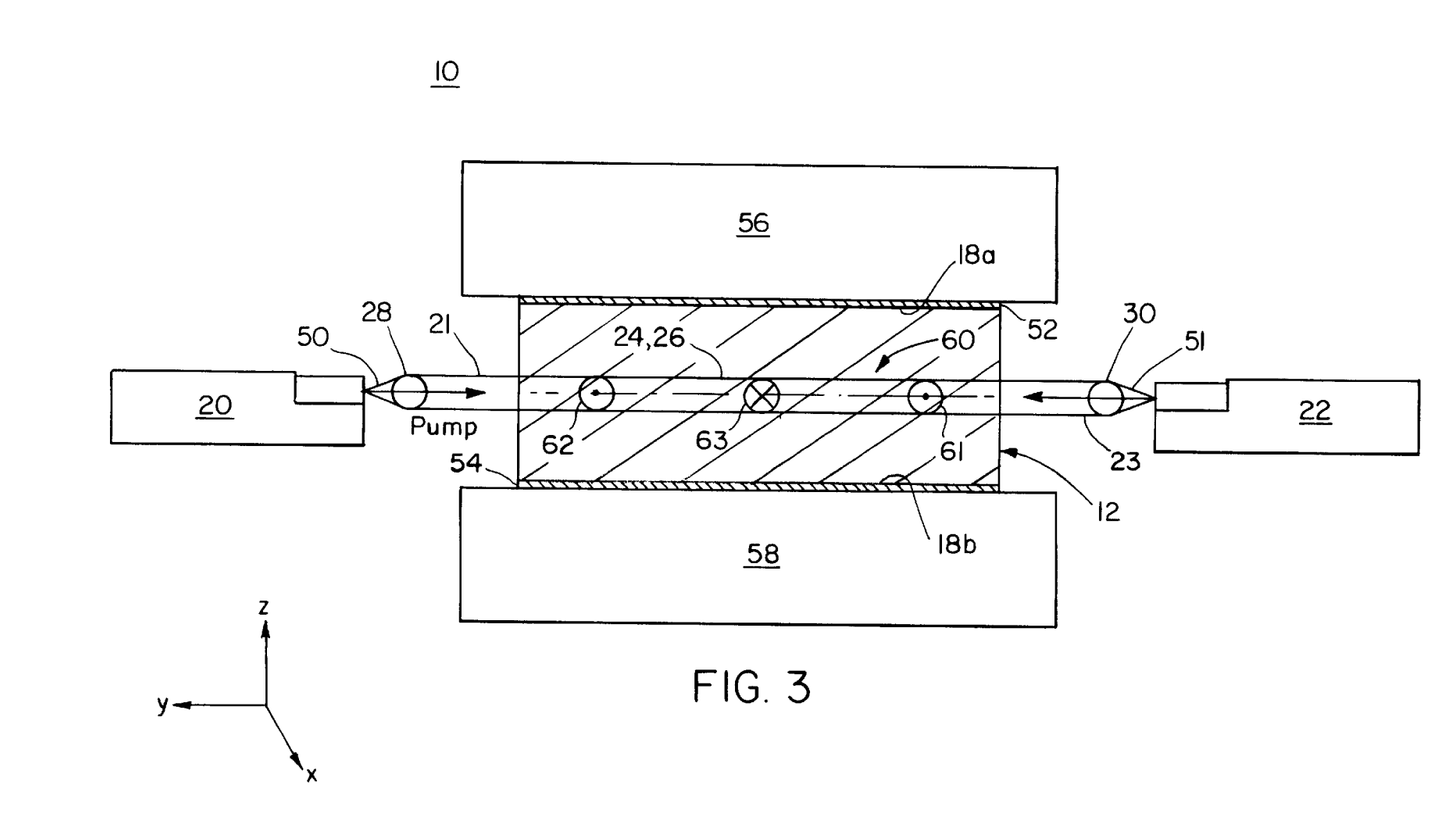
FIG. 3 is a cross-sectional view taken along line 3—3 of FIG. 1

Laser material 12 includes longitudinal end surfaces 14a and 14b which are disposed perpendicular to the longitudinal (x) dimension in which the laser mode or beam travels. Laser material 12 also includes width end surfaces 16a and 16b (y dimension) and thickness end surfaces 18a and 18b (z dimension) (not shown in this figure). Laser material 12 has a rectangular cross-section as shown in FIG. 3 taken along lines 3—3 of FIG. 1.

Diode-laser arrays 20 and 22 provide laser radiation beams 21 and 23 to regions 24 and 26, respectively, within laser material 12 through cylindrical lenses 28 and 30 and polished windows 32 and 34 on width end surfaces 16a and 16b of laser material 12. Laser radiation 21 and 23 propagates in the width (y) dimension which is transverse to the longitudinal (x) dimension that the laser mode propagates. Lenses 28 and 30 act to substantially collimate radiation 21 and 23 from arrays 20 and 22 in the thickness (z) dimension perpendicular to the longitudinal (x) dimension.

The diode pump lasers in arrays 20 and 22 may be, for example, Model 3470 from SDL, Inc., San Jose, Calif. or Model OPC-A020 from Opto-Power Corp., Tucson, Ariz., each of which is capable of generating 20 Watts of power at approximately 806 nm over a 1-cm-long emitting length. A wide variety of pump wavelengths can be used with this invention, however, operation has been found to be most effective with the diode array center wavelengths from 797–800 and 804–809 nm. Lower power pump lasers may be used as well, with resultant lower power laser beam outputs. The cylindrical lenses are typically 300 micrometer-diameter fiber lenses. The collimation need not be perfect and beam divergences of less than 20 milliradians are considered to be acceptable. Other fiber lenses ranging in diameter from 150–1500 micrometers may be used, as well as a wide variety of cylinder lenses of equivalent focal length.

Regions 24 and 26 through which radiation 21 and 23 from diode-laser arrays 20 and 22 propagate are each set back in the longitudinal dimension from longitudinal end surfaces 14a and 14b a predetermined distance d to constrain the radiation to the center of laser material 12. For best results, distance d is typically at least approximately equal to half of the thickness of material 12. These set backs of the radiation from longitudinal end surfaces 14a and 14b prevent the creation of strong thermal gradients near end surfaces 14a and 14b in end regions 36a and 36b. These thermal gradients would deform the longitudinal end surfaces causing end effects which consequently distort the laser beam output from laser 10. Thus, laser 10 by utilizing a fluoride laser material 12 alleviates the optical and polarizing distortion effects and stray pump-power dependence of these effects, typical of transversely pumped YAG lasers and by setting back the transversely pumped laser radiation from the longitudinal end surfaces it also eliminates the deleterious end effects typical of transversely pumped fluoride lasers which result because of the less favorable thermomechanical properties of fluoride compounds. An additional benefit of setting back the transversely pumped laser radiation from the longitudinal end surfaces is that pumped regions 24 and 26 which are constrained toward the center of material 12 coincide with the region of maximum spatial overlap of the multiple longitudinal laser beams in the preferred embodiment, thereby further increasing the spatial overlap between excitation and laser mode.

Figure 2:
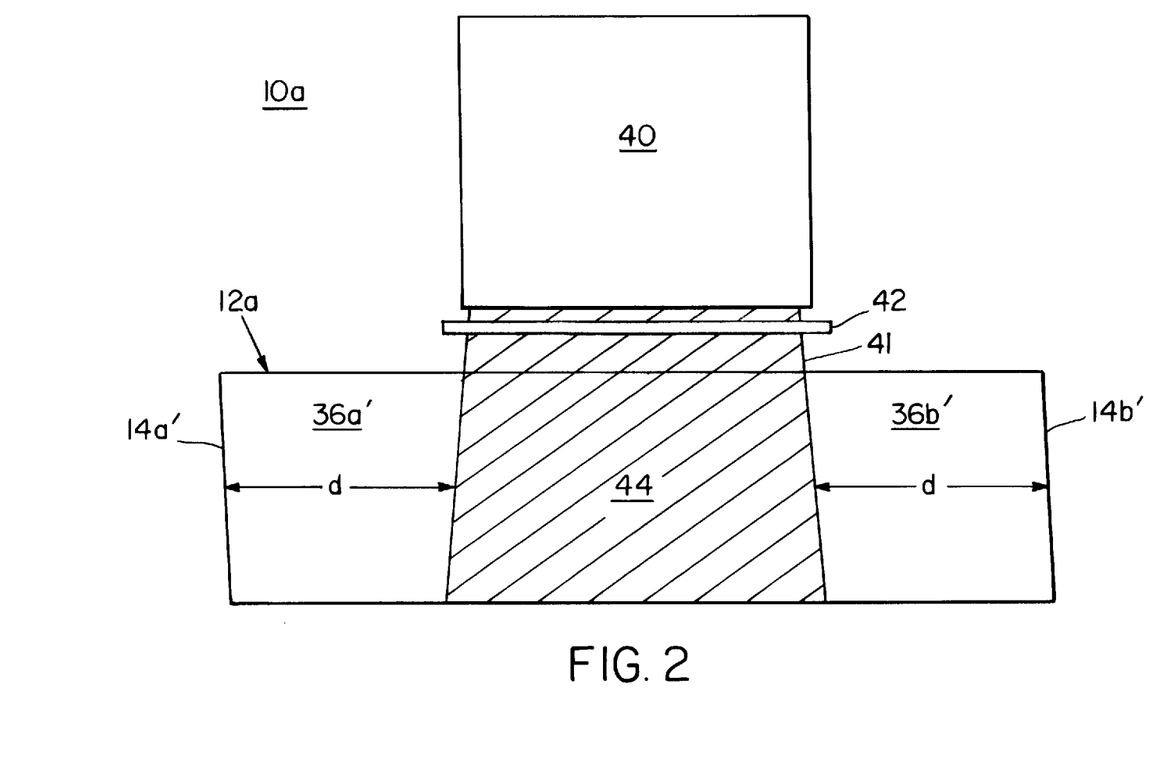
FIG. 2 is a top plan view of a transversely pumped solid state laser according to this invention similar to that of FIG. 1 with only a single pump source.

It is preferred that two pump sources be utilized such as laser arrays 20 and 22 located on opposite ends 16a and 16b of the width dimension of laser material 12 and longitudinally spaced from one another; however, this configuration is not required. This is illustrated in FIG. 2, which depicts transversely pumped solid state laser 10a with a single pump source, such as diode-laser array 40. Array 40 outputs laser radiation 41 through cylindrical lens 42 into region 44 of laser material 12a. Laser radiation in region 44 is offset longitudinally from longitudinal end surfaces 14a' and 14b' a distance d in regions 36a' and 36b'.

A cross-sectional view of transversely pumped solid state laser 10, taken along line 3—3 of FIG. 1, is shown in FIG. 3. The arrows labelled y and z are used to define the width dimension (y) and thickness dimension (z), respectively. Rays of radiation 50 and 51 emerging from laser arrays 20 and 22, respectively, are substantially collimated along the z axis by cylindrical lenses 28 and 30. Lenses 28 and 30 output radiation beams 21 and 23 which travel into laser material 12 in regions 24 and 26. Radiation beams 21 and 23 are arranged to lie in the same plane, substantially parallel to and centered between the large surfaces 18a and 18b of the thickness dimension. Heat generated in material 12 from radiation beam 21 and 23 flows in the thickness dimension through layers of interface material 52 and 54 on surfaces 18a and 18b, respectively, and into means 56 and 58 for removing heat which may be, for example, copper heat sinks or other devices maintained at a constant temperature through some means of cooling which are not shown. The layers of interface material may be formed of, for example, thermally conductive RTV, indium foil or lead-tin solder. The means 56 and 58 for removing heat are instrumental in reducing the thermal gradients in regions 36a and 36b, FIG. 1, and the resultant end effects on longitudinal end surfaces 14a and 14b which distort the laser beam. Removing heat from both surfaces 18a and 18b has the added advantage of reducing the maximum temperature rise in the center of the pumped region by about 50% and yielding a symmetrical heat distribution around the center plane of laser material 12. Thus, any bulk thermo-optic distortion that does occur may distort the phase-front of laser beam, but does not cause it to change in direction as the pump power is varied.

Regions 24 and 26 in laser material 12 are the excited regions and typically have approximately the same length along the longitudinal (x) dimension as that of laser arrays 20 and 22 and a height along the thickness (z) dimension set by lenses 28 and 30 which collect and collimate the radiation emission. The effective width of the excited region along the width (y) dimension is determined to a great extent by the pump-light absorption properties of laser material 12.

Figure 4:
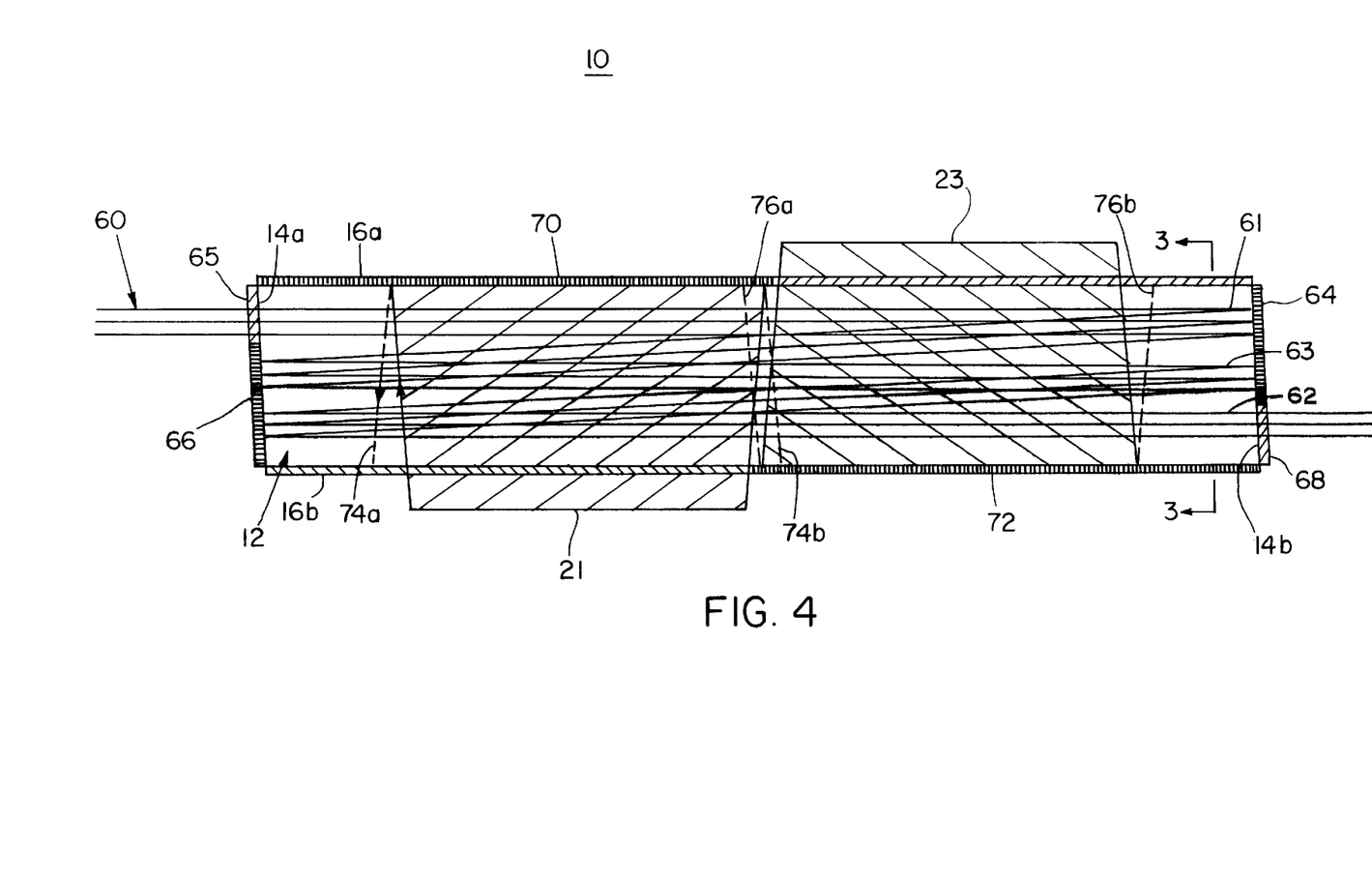
FIG. 4 is a more detailed top plan view of the transversely pumped solid state laser of FIG. 1 illustrating the laser mode ray trace in the laser material and depicting the optical coatings on the laser medium.

In excitation regions 24 and 26 of laser material 12, laser beam 60 travels in a multipass scheme which is more clearly shown in FIG. 4. Laser beam 60 propagates along the longitudinal (x) dimension coming out of the plane of the cross section of laser material 12, FIG. 3, at locations 61 and 62 and going in the opposite direction into the plane of the cross section of laser material 12 at location 63.

A more detailed top plan view of transversely pumped solid state laser 10 of FIG. 1 is shown in FIG. 4. In this figure, laser beam 60 is shown to be propagating through laser material 12 in a multi-pass scheme which enables the extraction of the maximum level of power from the excited regions 24 and 26. The multipass scheme serves to increase the spatial overlap between the excited volume in regions 24 and 26 and laser beam 60 as compared to the case where the laser beam makes only a single pass through material 12.

In this preferred embodiment, laser beam 60 passes through anti-reflection coating 62 on longitudinal end surface 14a of laser material 12 to the opposite longitudinal end surface 14b where laser beam 60 contacts highly reflective coating 64. Beam 60 is reflected back towards highly reflective coating 66 on surface 14a. Beam 60 makes three more passes back and forth between surfaces 14a and 14b until it finally exits material 12 through anti-reflection coating 68 on surface 14b. The angular orientation of longitudinal end surfaces 14a and 14b are arranged in a known manner so that when laser beam 60 is reflected from each of these surfaces, it does not return in exactly the same direction from which it impinged upon the surfaces. Although beam 60 does not always propagate within material 12 in a direction exactly parallel to the longitudinal (x) dimension, it does substantially propagate in that direction. Thus, the overall propagation direction of laser beam 60 is considered to be along the longitudinal (x) dimension of laser material 12 and transverse to the width (y) dimension.

The multipass scheme of FIG. 4 utilizes five passes through laser material 12, however, this number of passes is not required. The minimum desirable number of passes for efficient operation has been found to be three.

The diameter of beam 60 should be comparable to or larger than that of the height of the pumped radiation so that laser output beam 60 approaches the diffraction limit. Persons skilled in the art will recognize that there are many approaches that can be taken to establish the proper diameter of beam 60. These include the use of external mirrors to form the beam into the multipass pattern. In the preferred embodiment, however, shown in FIG. 4, the mirrors (64, 66) are coated directly on longitudinal end surfaces 14a and 14b. This reduces the number of external mirrors and the number of mirror adjustments required.

In addition, with the preferred embodiment shown in FIG. 4, pumped radiation beams 21 and 23 from arrays 20 and 22 are reflected back by reflective surfaces 70 and 72 on opposite end surfaces 16a and 16b. Reflective surfaces 70 and 72 are aligned with and located opposite their corresponding arrays 20 and 22, respectively. Due to the divergence of radiation beams 21 and 23, the radiation reflected from surfaces 70 and 72 returns back to occupy a somewhat larger area than the radiation incident upon these surfaces. The outer extent of radiation beam 21 returned from reflecting surface 70 is depicted by rays 74a and 74b, shown in phantom. The outer extent of the returned radiation from surface 72 is depicted by rays 76a and 76b. The purpose of using the two arrays 20 and 22 and the reflecting surfaces 70 and 72 is to increase the optical gain along the width (y) dimension of the pump radiation and make the integrated optical gain more uniform across that dimension.

Figure 5:
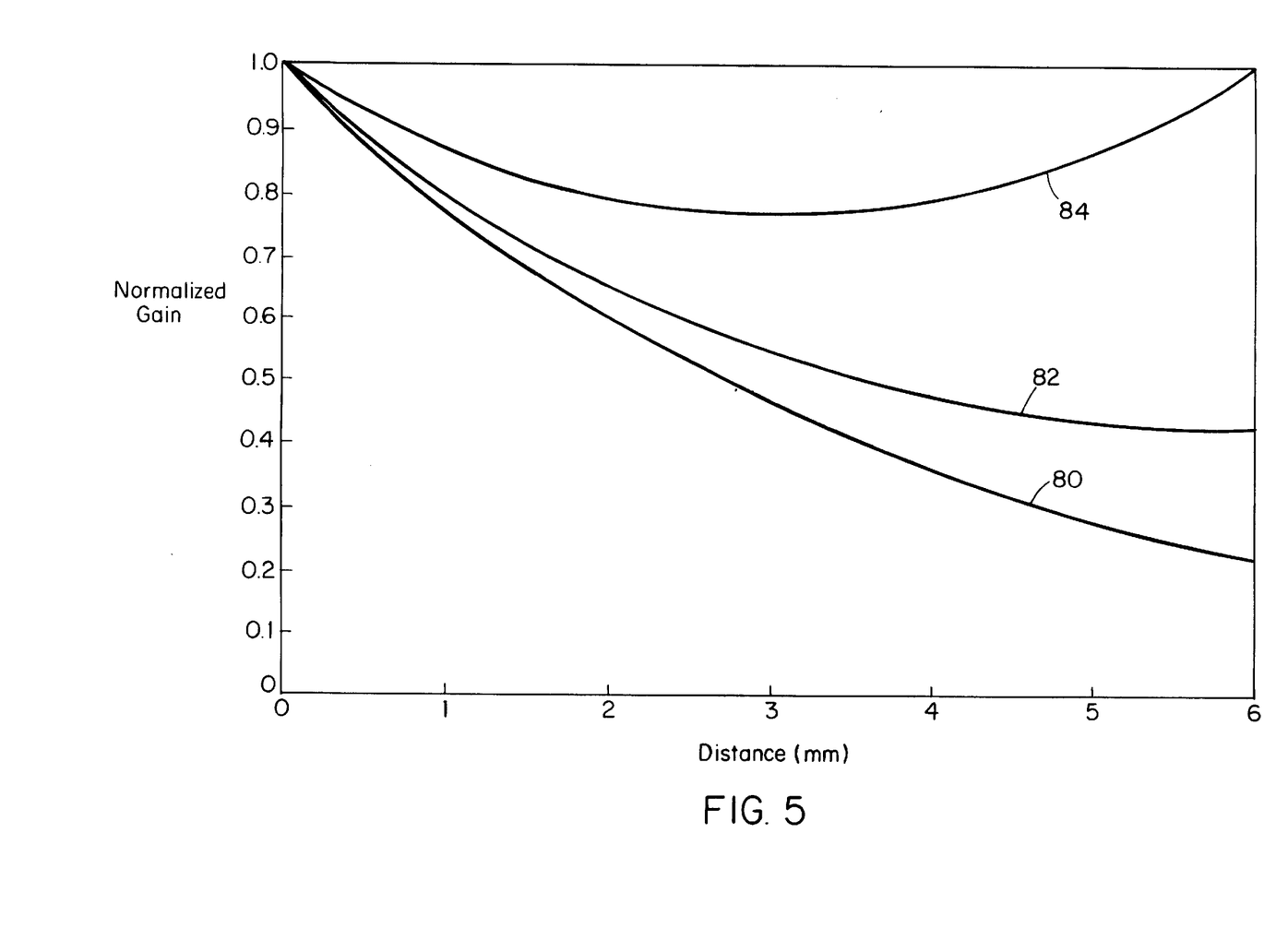
FIG. 5 is a plot of the normalized optical gain in the laser material as a function of distance from the edge of the material for three different diode-pumping configurations.

A plot of the exponential variation in excitation level and hence optical gain along the width (y) dimension is shown in FIG. 5. Curve 80 illustrates that the optical gain falls off fairly rapidly across the width of material 12 when only one array, such as array 20, FIG. 1, is used and no reflecting surface such as surface 70, FIG. 4, is used. Curve 82 illustrates that by utilizing a reflecting surface located opposite a single array, the optical gain in material 12 is increased and its uniformity across the width (y) dimension is made more uniform. Finally, curve 84 corresponds to the optical gain of the preferred embodiment shown in FIG. 4. Here it can be seen that the optical gain is high and substantially uniform across the entire width (y) dimension of material 12.

Greater uniformity in gain results in a reduced net thermal gradient for the laser beam along the longitudinal (x) dimension.

Figure 6:
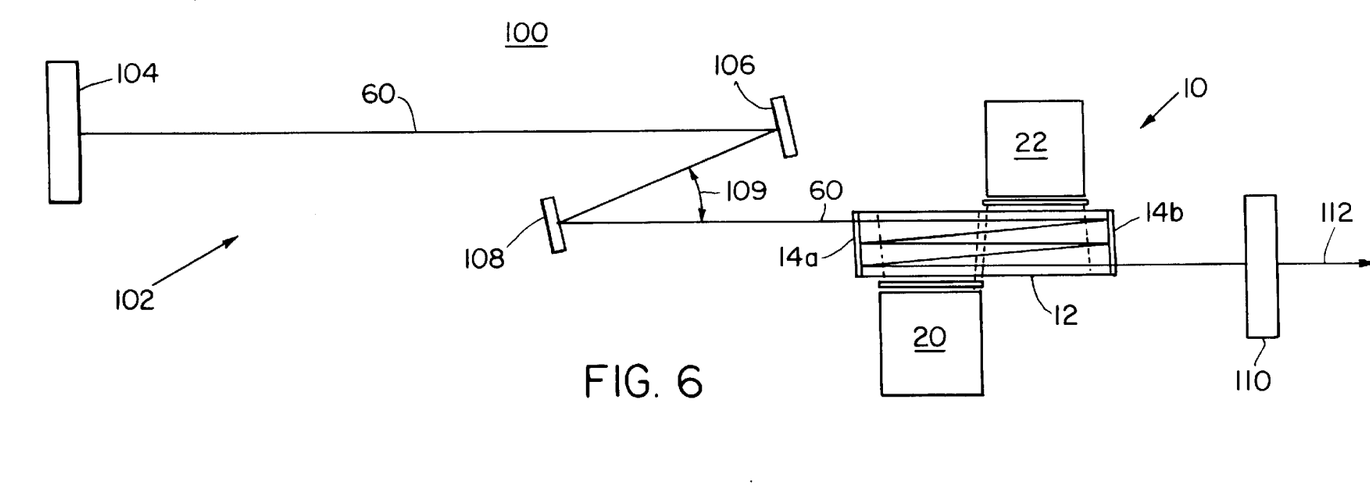
FIG. 6 is a schematic view of one embodiment of a laser resonator utilizing the transversely pumped solid state laser according to this invention.

Laser resonator 100, FIG. 6, is shown to include transversely pumped solid state laser 10 according to this invention within laser cavity 102. Resonator 100 uses a combination of four mirrors with flat, spherical and cylindrical surfaces to establish the proper beam diameter and to correct for minor thermal distortions that are created in laser material 12. Mirror 104, a high reflector at the laser beam 60 wavelength, has a cylindrical surface with the axis of the cylinder perpendicular to the plane of FIG. 6. Mirror 106, another highly reflective element, has a flat surface and serves only to redirect laser beam 60 for a more convenient mechanical design. Mirror 108, which is another highly reflective element, has a spherical surface which causes laser beam 60 to reflect from its surface at an angle 109. Finally, mirror 110 located proximate longitudinal end surface 14b of laser material 12 is a partial reflector at the laser beam wavelength and serves to couple out the laser power from within cavity 102 as indicated by laser beam output 112.

Cylindrical mirror 104 is convex with a typical radius in the range of 30–38 cm, although radii ranging from 20 to 97 cm have been used. In one construction the total optical path between mirrors 104 and 108 is in the range of 18–26 cm and angle 109 is typically 10°. Mirror 108 is a concave spherical design with a typical radius of 1 meter, however, radii from 0.5 to 1.5 meters have been used. In one embodiment the spacing from mirror 108 to laser material 12 was approximately 10 cm, while the spacing between mirror 110 and laser material 12 was in the range of 2–10 cm. The optimum transmission at the preferred laser wavelength of 1047 nm for mirror 110 was 45%, but the output power was only weakly dependent on the exact value of transmittance.

Figure 7:
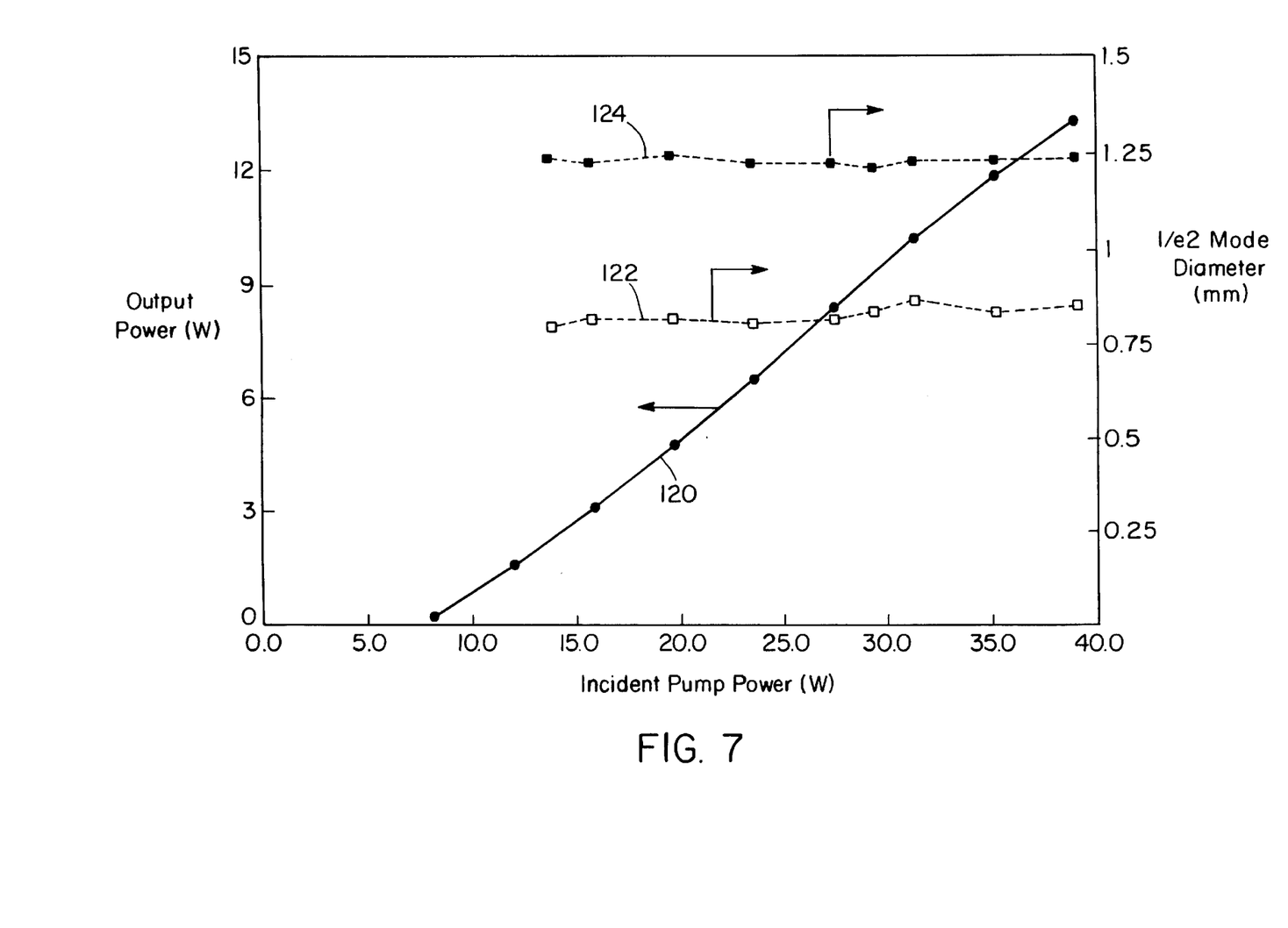
FIG. 7 is a plot of the solid state laser output power and output beam parameters as a function of diode-laser pump power.

Curve 120, FIG. 7, shows the solid state laser power output at 1047 nm as a function of total diode power from the pump sources incident on laser material 12 for laser resonator 100, FIG. 6. The average slope of curve 120 is approximately 42%. If all the incident pump power were converted to laser output power the expected slope would be 77%, thus this design extracts 55% of the maximum possible power in the diffraction limited mode. In absolute terms, resonator 100, utilizing the laser 10 according to this invention, converts approximately 34% of the pump power into output power. The present invention compares favorably with other efficient diode-pumped lasers designed for high levels of diffraction limited output. For example, other transverse pump designs are generally under 30% efficient. While longitudinally pumped designs have achieved efficiencies of 30–40%, they suffer from various other deficiencies including their limitations on maximum pump power as described above from which the laser of this invention does not suffer.

The output beam from resonator 100 described above is slightly elliptical in cross-section. Measurements of the beam dimensions at the surface of output mirror 110, FIG. 6, as a function of pump power illustrates that this invention produces an output beam with a beam size essentially independent of pump power. Curve 122, FIG. 7, is the mode diameter (measured at the $1/e^2$ points in power) for the dimension perpendicular to the plane of FIG. 6, while curve 124 is the mode diameter in the plane of FIG. 6. In addition, the output was measured to be linearly polarized with power in the orthogonal polarization less than 1% of the total output at full pump power. Thus, the present invention achieves the goal of reducing the effects of pump-induced thermal distortion on the laser output characteristics.

Although this invention is typically utilized to form a continuous wave (cw) output beam, the laser may be Q-switched by insertion of an acousto-optic or electro-optic modulator in laser resonator 100, FIG. 6. With acousto-optic switches fabricated either from fused silica, or $TeO_2$ material, repetitively Q-switched output pulses at rates ranging from 2–120 kHz may be achieved. Other anticipated modes of operation include cavity-dumped, mode-locked, intracavity harmonic generation or intracavity parametric generation. Pumping by pulsed rather than cw diode lasers is also possible.

Figure 8:
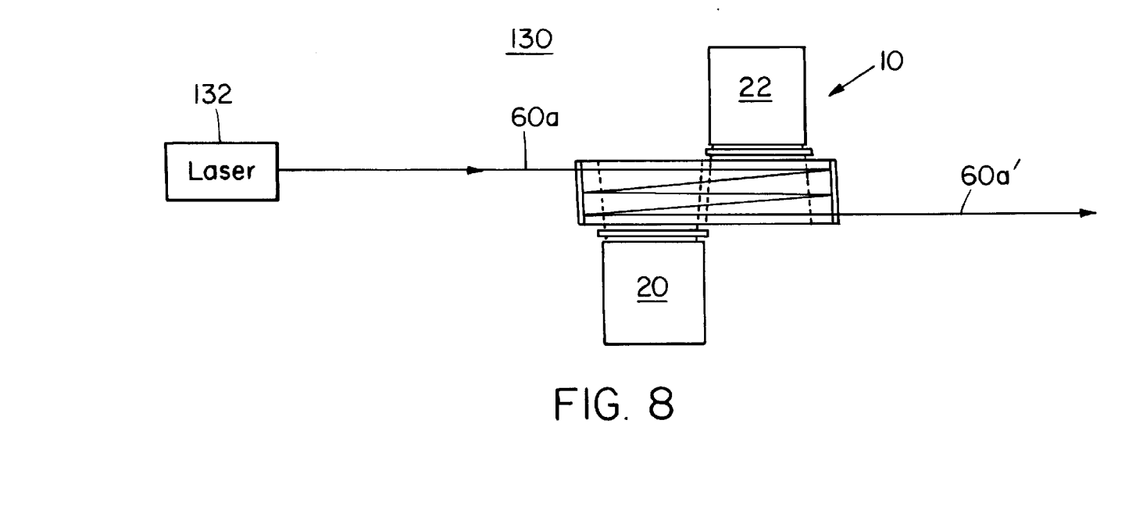
FIG. 8 is a schematic view of one embodiment of a laser amplifier utilizing the transversely pumped solid state laser according to this invention.

Laser 10 may be used in other than a resonator configuration such as shown in FIG. 6, e.g. an amplifier system 130, such as shown in FIG. 8. System 130 includes a laser source 132 which may actually be, for example, laser resonator 100 of FIG. 6 that generates a laser beam 60a. Beam 60a is provided to laser 10 where it is amplified and output from system 10 as amplified laser beam 60a'.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A transversely pumped solid state laser comprising:

a solid state gain medium having thickness, width and longitudinal dimensions;

means for forming a laser cavity with the medium for generating a laser beam along said longitudinal dimension; and a semiconductor laser pump source for directing a collimated pump beam to said medium along the width dimension transversely to said longitudinal dimension constrained toward the center of said medium and having a width which is substantially shorter than said longitudinal dimension of said medium for spacing the edges of said collimated beam away from the longitudinal ends of said medium to reduce the effects of pump-induced thermal distortion on the generated laser beam and thereby to provide a high quality diffraction—limited laser beam independent of pump source power.

2. The transversely pumped solid state laser of claim 1 further including means for removing heat from the ends of said thickness dimension.

3. The transversely pumped solid state laser of claim 1 in which said medium includes a reflective surface on the width end opposing the width end receiving the collimated pump beam.

4. The transversely pumped solid state laser of claim 1 in which said pump source includes at least two pumping devices longitudinally spaced on opposite sides of said medium.

5. The transversely pumped solid state laser of claim 1 in which said means for forming a laser cavity includes means for generating multiple longitudinal passes of the laser beam in said medium.

6. The transversely pumped solid state laser of claim 1 in which said medium is Nd:YLF.

7. The transversely pumped solid state laser of claim 1 in which the edges of said pump beam are spaced from the longitudinal ends of said medium by at least approximately half the thickness dimension of said medium.

8. A transversely pumped solid state laser amplifier comprising:

a solid state gain medium having thickness, width and longitudinal dimensions;

means for directing a laser beam to be amplified along the longitudinal dimension of said medium; and a semiconductor laser pump source for directing a collimated pump beam to said medium along the width dimension transversely to said longitudinal dimension constrained toward the center of said medium and having a width which is substantially shorter than said longitudinal dimension of said medium for spacing the edges of said collimated beam away from the longitudinal ends of said medium to reduce the effects of pump-induced thermal distortion on the laser beam to be amplified thereby to provide a high quality diffraction—limited laser beam independent of pump source power.

9. The transversely pumped solid state laser amplifier of claim 8 further including means for removing heat from the ends of said thickness dimension.

10. The transversely pumped solid state laser amplifier of claim 8 in which said medium includes a reflective surface on the width end opposing the width end receiving the collimated pump beam.

11. The transversely pumped solid state laser amplifier of claim 8 in which said pump source includes at least two pumping devices longitudinally spaced on opposite sides of said medium.

12. The transversely pumped solid state laser amplifier of claim 8 in which said means for directing the laser beam includes means for generating multiple longitudinal passes of the laser beam in said medium.

13. The transversely pumped solid state laser amplifier of claim 8 in which said medium is Nd:YLF.

14. The transversely pumped solid state laser amplifier of claim 8 in which the edges of said pump beam are spaced from the longitudinal ends of said medium by at least approximately half the thickness dimension of said medium.

15. A transversely pumped solid state laser comprising:

a solid state gain medium having a width, a length, and a thickness and having end surfaces on opposing ends of the length thereof;

at least one pump source for directing a collimated pump beam into the medium in a direction other than through the end surfaces of the medium;

means for constraining the pump beam away from the end surfaces of the medium to reduce the effects of pump-induced thermal distortion on the generated laser beam and thereby to provide a high quality diffraction—limited laser beam generated by the gain medium independent of pump source power: and means for removing heat from the thickness dimension of said gain medium.

16. The laser of claim 15 in which the pump beam is constrained to be directed at distance d from the end surfaces of the gain medium wherein $d \geq$ the thickness of the medium.

17. The laser of claim 16 further including means for forming a laser cavity within the medium for generating a laser beam along the length of the medium.

18. The laser of claim 17 in which said means for forming a laser cavity includes means for generating multiple passes of the laser beam in said medium.

19. The laser of claim 15 further including means for removing heat from the gain medium.

20. The laser of claim 15 in which said gain medium includes a reflective medium opposite the pump source.

21. The laser of claim 15 in which there are two pump sources and means for constraining the pump beam of each source away from the end surfaces of the gain medium.

22. The laser of claim 15 in which said medium is Nd:YLF.

23. The transversely pumped solid state laser of claim 15 in which the gain medium is rectangular having a top, bottom, side, and end surfaces.

* * * * *

UNITED STATES PATENT AND TRADEMARK OFFICE
CERTIFICATE OF CORRECTION

PATENT NO. : 5,774,489
DATED : June 30, 1998
INVENTOR(S) : Peter Moulton, et. al.

It is certified that error appears in the above-identified patent and that said Letters Patent is hereby corrected as shown below:

Title page, item [75], inventors: the third inventor, change "Robert J. Martisen" to --Robert J. Martinsen--.

Signed and Sealed this

Seventh Day of March, 2000

Q. TODD DICKINSON

Attest:

Attesting Officer

Commissioner of Patents and Trademarks